Sept. 28, 1926.

A. O. SARFF 1,601,648

VEGETABLE CUTTER

Filed June 20, 1925　　2 Sheets-Sheet 1

Fig. 1.

Austin O. Sarff
INVENTOR

BY Victor J. Evans
ATTORNEY

WITNESS

Sept. 28, 1926.  A. O. SARFF  1,601,648
VEGETABLE CUTTER
Filed June 20, 1925   2 Sheets-Sheet 2
Fig. 2.
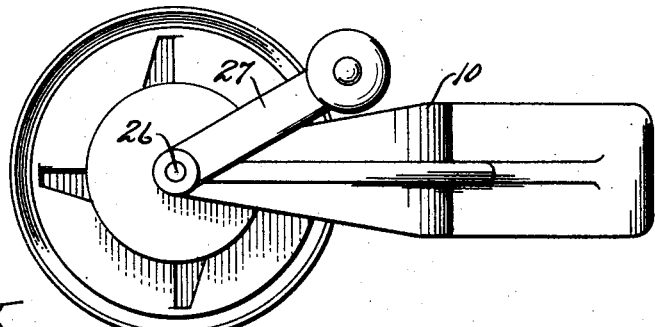
Fig. 5.  Fig. 3.
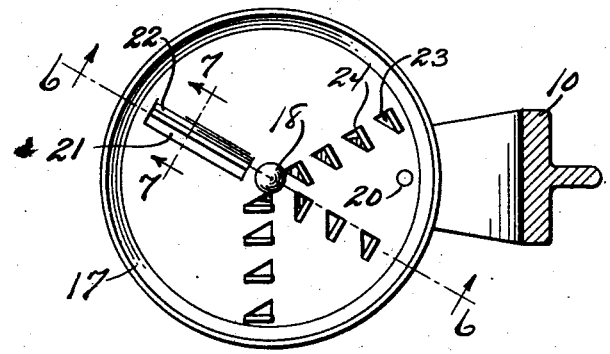 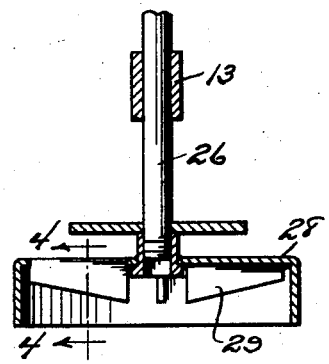
Fig. 6.  Fig. 4.
 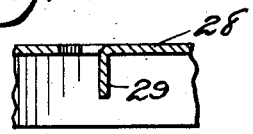
Fig. 7.
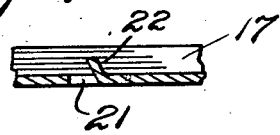
Austin O. Sarff INVENTOR
BY Victor J. Evans
ATTORNEY Patented Sept. 28, 1926.

1,601,648

UNITED STATES PATENT OFFICE.

AUSTIN O. SARFF, OF WALKER, MINNESOTA.

VEGETABLE CUTTER.

Application filed June 20, 1925. Serial No. 38,516.

This invention relates to an apparatus for slicing or cutting vegetables and the like, and has for its object the provision of a novel device capable of hand operation and provided with means whereby potatoes, carrots and other vegetables, as well as many different kinds of fruits may be sliced, shredded or cut preparatory to subsequent treatment.

An important object is the provision of a device of this character which is provided with means whereby it may be clamped upon the edge of a table, support or the like to be maintained in operative position, the device being furthermore of light and simple construction whereby to be readily portable.

Another object is the provision of a device of this character including an operating shaft which is rotatable and slidable through a supporting bearing and carrying a follower holding the vegetables, fruit or the like into engagement with the cutting element, the slidability of the operating shaft permitting feeding of the article to the knives.

Yet another object is the provision of a cutter of this character which is so constructed and arranged that when the butt end of the vegetable or fruit has been reached the follower element cannot come in contact with the knives and cause damage thereto by such engagement.

Still another object is the provision of a device of this character having a peculiar arrangement of cutting elements, certain of which will act to shred or cut the article into very thin strings or strips and another of which will operate to effect severing.

A still further object is to provide a device of this character which will be simple and inexpensive in manufacture, easy to use, positive in artion, efficient and durable in service, and a general improvement in the art.

With the above and other objects and advantages in view, the invention consists in the details of construction and the arrangement and combination of parts to be hereinafter more fully described and claimed, and illustrated in the accompanying drawings, in which:—

Figure 1 is a side elevation of the complete device in use.

Figure 2 is a top plan view thereof.

Figure 3 is a detail vertical section taken through the follower and vegetable or fruit holder.

Figure 4 is a detail section taken on the line 4—4 of Figure 3.

Figure 5 is a horizontal section taken on the line 5—5 of Figure 1.

Figure 6 is a detail section on the line 6—6 of Figure 5, and

Figure 7 is a section on the line 7—7 of Figure 5.

Referring more particularly to the drawings, I have shown the device as comprising a substantially U-shaped frame 10 including vertically spaced upper and lower arms 11 and 12, the former of which terminates in a bearing 13 and the latter of which terminates in a boss 14. The centers of the bearing 13 and boss 14 are in vertical alinement as clearly indicated. At one side, the body or frame 10 is provided with a U-shaped socket portion 15 engageable upon the edge of a table, shelf or other support and having one arm equipped with a clamping screw 16 by means of which the device may be rigidly secured in place while in use.

Mounted upon the top of the lower arm 12 of the frame is a pan like member 17 held in place by a spur 18 which has its upper end pointed and projecting upwardly and which is formed at its lower end with a reduced extension 19 passing through the center of the pan and screwed into the boss 14. If desired, some auxiliary securing means such as a rivet or the like indicated at 20 may be used for holding the pan in place and preventing it from displacement with respect to the arm. The bottom of the pan 17 is formed at one point with a slot 21 formed by cutting and pressing the material upwardly, the upstruck material defining a cutting blade 22. At spaced points the bottom of the pan is formed with radial rows of triangular openings 23, the material being punched or upstruck to define upstanding teeth 24 arranged edgewise to the path of movement of the vegetable being cut. The teeth in the successive rows are staggered so that they will all be engaged by the vegetable.

Slidable and rotatable through the bearing at the end of the upper arm 11 is an operating shaft 26 equipped with a crank handle 27 or the like by means of which it may be rotated. At its lower end, the shaft 26 carries a combined follower and holder 28 of inverted cup-like formation slit at intervals and pressed or otherwise formed to define a plurality of downwardly extending penetrating members 29 adapted to engage within the vegetable or fruit to be cut for holding it and providing a drive connection whereby it will rotate when the shaft is turned.

Assuming that the device has been constructed and assembled as above described, the operation is as follows: The shaft 26 is moved upwardly in order to elevate the follower 28 so as to provide sufficient space that the vegetable, for instance a potato indicated at A, may be inserted between the pan and the follower, the potato being impailed upon the spur 18. The shaft 26 is then pressed downwardly in order to cause the members 29 to penetrate the potato and provide a driving connection between it and the shaft. Subsequently to this, the operator grasps the crank handle or other means provided for the purpose, and turns the shaft 26 while pressing downwardly thereon. The result will be that the potato is rotated in engagement with the cutters 22 and 24. As the potato is moved over the cutters 24 it is apparent that they will act to shred the potato or cut it into a plurality of relatively small or fine strings or shreds B which will be severed upon engagement with the cutter 22. Obviously, the number of teeth 24 may be made more or less depending upon preference, and the arrangement of these cutters may also be varied. While a potato has been specifically referred to it should of course be understood that any other similar vegetable and many fruits may be treated in the same manner if such is found desirable for any reason.

From the foregoing description and a study of the drawings, it will be readily apparent that I have thus provided a simply constructed, inexpensive and easily operated device for the purpose specified, and one consisting of only a few parts which may be readily disconnected, if preferred, for cleaning purposes in order that the device may be kept in a thoroughly sanitary condition. Owing to the peculiar construction of the pan member and the follower it is apparent that when substantially all of the vegetable or fruit has been cut or shredded there will be no possibility of the penetrating members within the follower striking against the cutters inasmuch as the lower edge of the follower will engage the supporting pan of the device and prevent such an action. It is believed that the construction, operation and advantages will be readily apparent to one skilled in the art without further explanation.

While I have shown and described the preferred embodiment of the invention, it should be understood that the right is reserved to make all such changes in the details of construction and the arrangement and combination of parts as will not depart from the spirit of the invention or the scope of the subjoined claims.

Having thus described the invention, I claim:—

1. In a vegetable cutter comprising a fixed knife and a rotatable follower, the follower consisting of a longitudinally slidable and rotatable shaft, a cap thereon adapted to engage a vegetable to be cut, said cap having a downturned flange to prevent engagement of the knives by the follower.

2. In a vegetable cutter including stationary knives, a rotatable and longitudinally slidable shaft equipped with turning means, a follower carried by said shaft and formed as an inverted cup-like member having its top formed with slots at the edges of which are depending knives cooperating with the stationary knives, the cup member having a depending flange adapted to engage against the stationary support for the stationary knives for preventing engagement of the second named knives with the first named knives.

3. In a vegetable cutter, a support, stationary knives carried thereby, a rotatable and longitudinally slidable shaft equipped with turning means, and a follower carried by the shaft and formed as an inverted cup-like member having its top formed with slots and depending knives at the edges thereof, the follower further including a depending flange adapted to engage against the support for the stationary knives and to bear thereagainst for limiting the downward longitudinal movement of the shaft and follower and preventing engagement of the movable knives with the stationary knives.

In testimony whereof I affix my signature.

AUSTIN O. SARFF.